(12) United States Patent
Kuniyoshi (10) Patent No.: US 11,823,824 B2
(45) Date of Patent: Nov. 21, 2023

(54) R-T-B SINTERED MAGNET

(71) Applicant: PROTERIAL, LTD., Tokyo (JP)

(72) Inventor: Futoshi Kuniyoshi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/027,690

(22) PCT Filed: Sep. 17, 2021

(86) PCT No.: PCT/JP2021/034362
§ 371 (c)(1),
(2) Date: Mar. 22, 2023

(87) PCT Pub. No.: WO2022/065242
PCT Pub. Date: Mar. 31, 2022

(65) Prior Publication Data
US 2023/0260684 A1 Aug. 17, 2023

(30) Foreign Application Priority Data
Sep. 23, 2020 (JP) .................. 2020-158819

(51) Int. Cl.
*H01F 1/057* (2006.01)
*C22C 38/00* (2006.01)

(52) U.S. Cl.
CPC ......... *H01F 1/0577* (2013.01); *C22C 38/005* (2013.01)

(58) Field of Classification Search
CPC .................... H01F 1/0577; C22C 38/005
See application file for complete search history.

(56) References Cited

U.S. PATENT DOCUMENTS 9,281,105 B2 * 3/2016 Miyamoto ............. C22C 38/16
10,734,143 B2 * 8/2020 Fujikawa ............... H01F 1/0576
(Continued)

FOREIGN PATENT DOCUMENTS

JP 2019-208013 A 12/2019
WO 2007/102391 A1 9/2007
(Continued)

OTHER PUBLICATIONS

Official Communication issued in International Patent Application No. PCT/JP2021/034362, dated Dec. 21, 2021.

*Primary Examiner* — Bernard Rojas
(74) *Attorney, Agent, or Firm* — Keating & Bennett, LLP (57) ABSTRACT

The present disclosure includes a main phase comprising an $R_2T_{14}B$ compound, and a grain boundary phase. The atom number ratio of B to T in this R-T-B sintered magnet is less than the atom number ratio of B to T in the stoichiometric composition of the $R_2T_{14}B$ compound, and the relationships 26.0 mass %≤([Nd]+[Pr]+[Ce]+[Dy]+[Tb])−(9×[O]+12×[C])≤27.5 mass %, 0.15 mass %≤[O]≤0.30 mass %, and 0.05 mass %<[Tb]≤0.35 mass % are satisfied, where [Nd] is the Nd content (mass %), [Pr] is the Pr content (mass %), [Ce] is the Ce content (mass %), [Dy] is the Dy content (mass %), [O] is the O content (mass %), and [C] is the C content (mass %). Tb concentration and/or the Dy concentration gradually decreases from the magnet surface toward the magnet interior, at least in part.

7 Claims, 3 Drawing Sheets

(56) References Cited

U.S. PATENT DOCUMENTS

| | | | |
|---|---|---|---|
| 2005/0284545 A1* | 12/2005 | Komuro | H01F 1/0572 |
| | | | 148/302 |
| 2007/0034299 A1* | 2/2007 | Machida | H01F 1/0575 |
| | | | 148/105 |
| 2008/0245442 A1* | 10/2008 | Nakamura | H01F 41/0293 |
| | | | 148/101 |
| 2008/0286595 A1 | 11/2008 | Yoshimura et al. | |
| 2018/0286545 A1* | 10/2018 | Fujikawa | H01F 41/0293 |
| 2019/0371522 A1 | 12/2019 | Kuniyoshi | |

FOREIGN PATENT DOCUMENTS

| | | |
|---|---|---|
| WO | 2018/143230 A1 | 8/2018 |
| WO | 2019/065481 A1 | 4/2019 |

* cited by examiner

R-T-B SINTERED MAGNET

TECHNICAL FIELD

The present invention relates to a sintered R-T-B based magnet.

BACKGROUND ART

Sintered R-T-B based magnets (R is at least one of rare-earth elements; T is Fe, or Fe and Co; and B is boron) are known as permanent magnets with the highest performance, and are used in various types of motors such as voice coil motors (VCMs) for hard disc drives, traction motors for electric vehicles (EVs, HVs, PHVs, etc.) and the like, motors for industrial equipment, consumer electronics, and the like.

A sintered R-T-B based magnet includes a main phase which is mainly formed of an $R_2T_{14}B$ compound and a grain boundary phase that is at the grain boundaries of the main phase. The $R_2T_{14}B$ compound, which forms the main phase, is a ferromagnetic material having high saturation magnetization and an anisotropy field, and has a strong influence on the properties of the sintered R-T-B based magnet.

There exists a problem in that coercivity $H_{cJ}$ (hereinafter, simply referred to as "$H_{cJ}$") of sintered R-T-B based magnets decreases at high temperatures, thus causing an irreversible thermal demagnetization. For this reason, sintered R-T-B based magnets for use in motors for electric vehicles, in particular, are required to have high $H_{cJ}$ even at high temperatures, i.e., to have higher $H_{cJ}$ at room temperature.

CITATION LIST

Patent Literature

Patent Document No. 1: International Publication No. 2007/102391
Patent Document No. 2: International Publication No. 2018/143230

SUMMARY OF INVENTION

Technical Problem

It is known that in the case where a light rare-earth element RL (mainly, Nd or Pr) in an $R_2T_{14}B$ based compound is replaced with a heavy rare-earth element RH (mainly, Tb or Dy), the $H_{cJ}$ is improved. However, there is a problem that such a replacement, although improving the $H_{cJ}$, decreases the saturation magnetization of the $R_2T_{14}B$ based compound and therefore, decreases remanence Br (hereinafter, simply referred to as "$B_r$"). Tb, particularly, is present in a very small quantity as resources and is produced in limited areas. For this and other reasons, Tb has problems of not being supplied stably and changing in costs. Therefore, it is demanded to provide high $H_{cJ}$ while suppressing the decrease in the Br with Tb being used as little as possible (with Tb being used in a minimum possible amount).

Patent Document No. 1 describes, while supplying a heavy rare-earth element RH onto a surface of a sintered magnet of an R-T-B based alloy, allowing the heavy rare-earth element RH to diffuse into an interior of the sintered magnet. According to the method described in Patent Document No. 1, the heavy rare-earth element RH is diffused from the surface of the sintered R-T-B based magnet into the interior thereof, thus allowing the heavy rare-earth element RH to thicken in an outer crust of a main phase crystal grain, which is effective for the $H_{cJ}$ improvement. Thus, high $H_{cJ}$ is provided with a suppressed decrease in the Br.

Patent Document No. 2 describes diffusing a light rare-earth element RL and Ga, together with a heavy rare-earth element RH, from a surface of a sintered R-T-B based body into an interior of a magnet via grain boundaries. The method described in Patent Document No. 2 promotes the diffusion of the heavy rare-earth element RH into the interior of the magnet, and thus provides extremely high $H_{cJ}$ while decreasing the amount of use of the heavy rare-earth element RH.

It has been recently demanded, particularly for, for example, the motors for electric vehicles, to provide higher Br and higher $H_{cJ}$ while decreasing the amount of use of a heavy rare-earth element RH, especially, Tb.

Various embodiments of the present disclosure provide a sintered R-T-B based magnet having high $B_r$ and high $H_{cJ}$ with the amount of use of Tb being decreased.

Solution to Problem

In a non-limiting illustrative embodiment, a sintered R-T-B based magnet according to the present disclosure is a sintered R-T-B based magnet (R contains at least two rare-earth elements, contains Nd, and contains at least one of Tb and Dy; T is Fe, or Fe and Co; and B is boron) including a main phase formed of an $R_2T_{14}B$ compound; and a grain boundary phase at grain boundaries of the main phase. Where Nd is contained at a content (mass %) represented as [Nd], Pr is contained at a content (mass %) represented as [Pr], Ce is contained at a content (mass %) represented as [Ce], Dy is contained at a content (mass %) represented as [Dy], Tb is contained at a content (mass %) represented as [Tb], O is contained at a content (mass %) represented as [O], and C is contained at a content (mass %) represented as [C], B has an atomic ratio with respect to T in the sintered R-T-B based magnet that is lower than an atomic ratio of B with respect to T in a stoichiometric composition of the $R_2T_{14}B$ compound, and the sintered R-T-B based magnet satisfies the relationships of 26.0 mass≤([Nd]+[Pr]+[Ce]+[Dy]+[Tb])−(9× [O]+12×[C])≤27.5 mass %, 0.15 mass %≤[O]≤0.30 mass %, and 0.05 mass %<[Tb]≤0.35 mass %. The sintered R-T-B based magnet includes a portion in which at least one of a concentration of Tb and a concentration of Dy gradually decreases from a surface toward an interior thereof.

In an embodiment, the sintered R-T-B based magnet has remanence ($B_r$) of 1.43 T or higher and coercivity ($H_{cJ}$) of 1900 kA/m or higher.

In an embodiment, B is contained at a content (mass %) represented as [B], 0.90 mass %≤[B]≤0.97 mass %.

In an embodiment, 0.05 mass %≤[C]≤0.18 mass %, and [C]<[O].

In an embodiment, the sintered R-T-B based magnet includes a portion in which a concentration of Pr gradually decreases from the surface toward the interior thereof.

In an embodiment, the sintered R-T-B based magnet includes a portion in which a concentration of M (M is at least one selected from the group consisting of Ga, Cu, Zn and Si) gradually decreases from the surface toward the interior thereof.

In an embodiment, 0.05 mass %<[Tb]≤0.30 mass %.

Advantageous Effects of Invention

Embodiments of the present disclosure provide a sintered R-T-B based magnet having high $B_r$ and high $H_{cJ}$ with the amount of use of a heavy rare-earth element RH such as Tb or the like being decreased.

DESCRIPTION OF EMBODIMENTS

First, a fundamental structure of a sintered R-T-B based magnet according to the present disclosure will be described. The sintered R-T-B based magnet has a structure in which powder particles of a raw material alloy are bound together through sintering, and includes a main phase which is mainly formed of $R_2T_{14}B$ compound grains and a grain boundary phase which is at grain boundaries of the main phase.

Figure 1A:
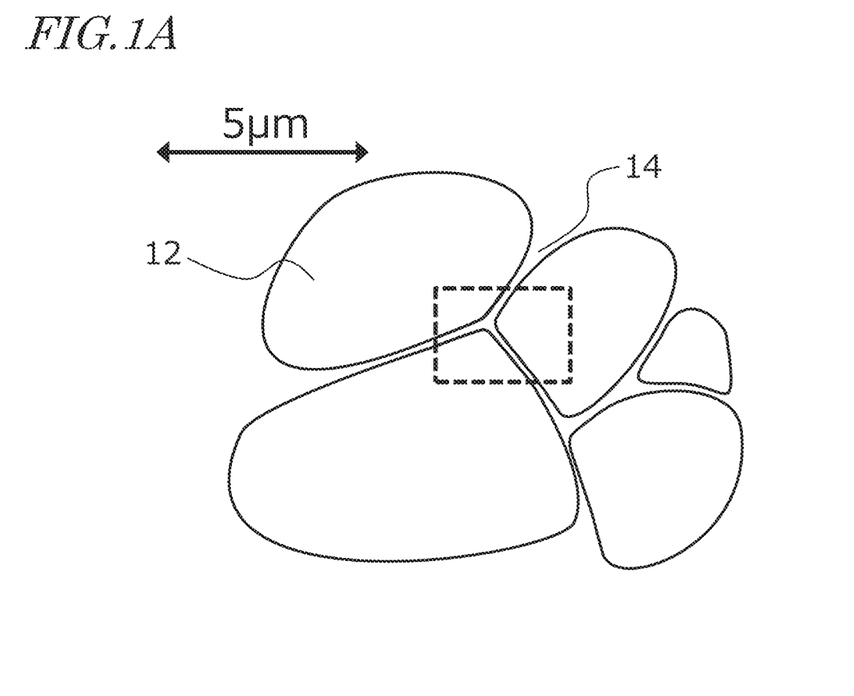
FIG. 1A is an enlarged schematic cross-sectional view of a part of a sintered R-T-B based magnet.
Figure 1B:
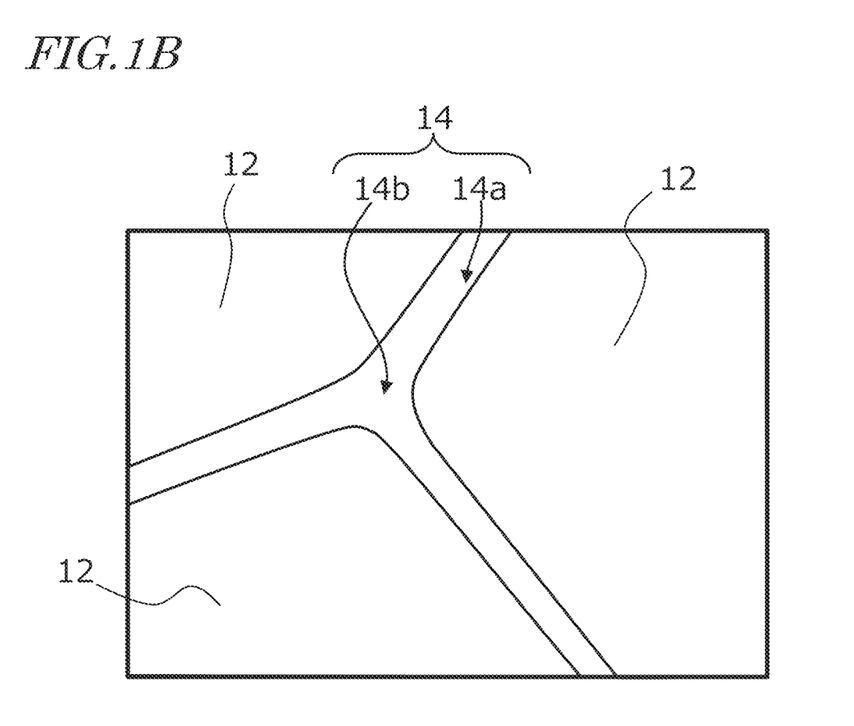
FIG. 1B is a further enlarged schematic cross-sectional view of the broken-lined rectangular region in FIG. 1A.

FIG. 1A is an enlarged schematic cross-sectional view of a part of a sintered R-T-B based magnet. FIG. 1B is a further enlarged schematic cross-sectional view of the broken-lined rectangular region in FIG. 1A. FIG. 1A shows an arrow indicating a length of 5 μm as an example of reference length to represent sizes. As shown in FIG. 1A and FIG. 1B, the sintered R-T-B based magnet includes a main phase 12 mainly formed of an $R_2T_{14}B$ compound and a grain boundary phase 14 at grain boundaries of the main phase 12. As shown in FIG. 1B, the grain boundary phase 14 includes an intergranular grain boundary phase 14a, along which two $R_2T_{14}B$ compound grains adjoin each other, and a grain boundary triple junction 14b, at which three $R_2T_{14}B$ compound grains adjoin one another. A typical crystal grain size of the main phase is not shorter than 3 μm and not longer than 10 μm, this being an average value of the diameter of an approximating circle in a cross section of the magnet. The $R_2T_{14}B$ compound, which forms the main phase 12, is a ferromagnetic material having high saturation magnetization and an anisotropy field. Therefore, in a sintered R-T-B based magnet, it is possible to improve the $B_r$ by increasing the abundance ratio of the $R_2T_{14}B$ compound, which forms the main phase 12. In order to increase the abundance ratio of the $R_2T_{14}B$ compound, an R amount, a T amount and a B amount in the raw material alloy may be brought closer to the stoichiometric ratio of the $R_2T_{14}B$ compound (the R amount:the T amount:the B amount=2:14:1).

However, because the sintered R-T-B based magnet also includes the grain boundary phase 14, R, T and B in the raw material alloy are consumed to form the grain boundary phase 14 as well as to form the main phase 12. The grain boundary phase 14 is melted during a sintering step and acts to physically bind the $R_2T_{14}B$ compound grains, which form the main phase 12, to each other. Therefore, the grain boundary phase 14 is conventionally designed to have a rare-earth-rich (R-rich) composition having a relatively low melting point. Specifically, the R amount in the raw material alloy is conventionally set to be larger than the stoichiometric ratio thereof in the $R_2T_{14}B$ compound, so that the resultant extra R is used to form the grain boundary phase. It is also known that the structure of the grain boundary phase 14, specifically, the types and the amounts of the substances contained in the grain boundary phase 14 influence the level of the $H_{cJ}$.

As described above, according to the method disclosed in Patent Document No. 2, a light rare-earth element RL (in particular, Pr) and Ga are diffused, together with a heavy rare-earth element RH (e.g., Tb), from the surface of the sintered R-T-B based body into the interior of the magnet via the grain boundaries. Pr and Ga diffused into the grain boundaries promote the diffusion of the heavy rare-earth element RH such as Tb or the like into the interior of the magnet, and as a result, extremely high $H_{cJ}$ is realized. However, it has been found out by studies made by the present inventor that the diffusion of Pr and Ga into the interior of the magnet thickens an intergranular grain boundary phase, and as a result, there may be a case where the volume ratio of the main phase is decreased, resulting in undesirable decrease in the $B_r$. In order to allow the diffusion of Tb to significantly progress and thus to provide high $H_{cJ}$, it is effective to diffuse Pr and Ga. However, it has been found out that the amounts of Pr and Ga to be diffused need to be minimized in order to prevent the intergranular grain boundary phase from being excessively thick.

It has also been found out that the structure of the grain boundary phase (the types and the concentrations of the substances that may be present at the grain boundaries, for example, iron-based compounds, rare-earth compounds and the like) vary in accordance with whether or not the atomic ratio of B with respect to T (B/T) in the sintered R-T-B based magnet is lower than the atomic ratio of B with respect to T in the stoichiometric composition of the $R_2T_{14}B$ compound.

The present inventor has found out that in the case where the atomic ratio of B with respect to T (B/T) in the sintered R-T-B based magnet is lower than 1/14, which is the atomic ratio of B with respect to T in the stoichiometric composition of the $R_2T_{14}B$ compound, the effect of improving the properties of the magnet provided by the diffusion of Pr and Ga into the grain boundaries is enhanced. Specifically, in the case where the atomic ratio B/T is lower than 1/14, the diffusion of Pr and Ga into the grain boundaries is promoted. Substantially the same effect is provided even in the case where B is partially replaced with carbon (C) in the $R_2T_{14}B$ compound. It has also been found out that even in the case where Cu, Zn and/or Si is diffused instead of Ga, or in addition to Ga, together with Pr, the properties of the magnet are improved by the diffusion of a relative small amount of a heavy rare-earth element of Tb, Dy or the like. Hereinafter, one or more metal materials selected from the group consisting of Ga, Cu, Zn and Si may be collectively referred to as a "metal element M".

In the case where Pr and a metal element M are diffused, together with a heavy rare-earth element RH, from the surface of the sintered R-T-B based body into the interior thereof, the atomic ratio B/T is one of important parameters based on which the behavior of the diffusion into the grain boundaries is adjusted to improve the properties of the magnet. Hereinafter, a sintered R-T-B based body having an atomic ratio B/T lower than 1/14 may be referred to as a "low boron sintered R-T-B based body", and a sintered R-T-B based magnet having an atomic ratio B/T lower than 1/14 may be referred to as a "low boron sintered R-T-B based magnet". In the present disclosure, a sintered R-T-B based magnet before and during the diffusion will be referred to as a "sintered R1-T-B based body", and a sintered R-T-B based magnet after the diffusion will be referred to simply as a "sintered R-T-B based magnet".

It has been found out as a result of further studies made by the present inventor that C replacing B in the $R_2T_{14}B$ compound as the main phase is bound with a rare-earth element at the grain boundaries by a sintering step to generate a rare-earth oxygen carbon compound (R—O—C compound) at the grain boundaries. It has also been found out that the atomic ratio in this case is R:(C,O)=1:1. In the case where such an R—O—C compound is generated at the grain boundaries, the content of C in the $R_2T_{14}B$ compound as the main phase is decreased by the content thereof in the R—O—C compound. As described above, even if B in the $R_2T_{14}B$ compound is partially replaced with C, the effect by "low boron" is provided. Therefore, the decrease in the content of C in the $R_2T_{14}B$ compound as the main phase indicates that the total amount of B and C is effectively decreased. The formation of the R—O—C compound at the grain boundaries indicates that the rare-earth elements R contained in the raw material alloy are partially consumed to generate the R—O—C compound. The R—O—C compound encompasses an R—O compound (rare-earth oxide) and an R—C compound (rare-earth carbide).

Based on the above, the present inventor assumed that in the case where Tb and/or Dy is diffused, simultaneously with a metal element M of Ga or the like and Pr, from a surface of a low boron sintered R-T-B based body into an interior thereof, the thickness or the structure of the grain boundaries needs to be controlled in order to optimize the effect of improving the properties of the magnet by the diffusion, and that for this purpose, the contents of R, O and C need to satisfy an appropriate relationship. As a result of studies, the present inventor has found out the following: where Nd is contained at a content (mass %) represented as [Nd], Pr is contained at a content (mass %) represented as [Pr], Ce is contained at a content (mass %) represented as [Ce], Dy is contained at a content (mass %) represented as [Dy], Tb is contained at a content (mass %) represented as [Tb], O is contained at a content (mass %) represented as [O], and C is contained at a content (mass %) represented as [C], in the case where Pr and M are diffused, together with Tb, into a sintered R1-T-B based body adjusted to have a relationship in the range of 25.8 mass %≤([Nd]+[Pr]+[Ce]+[Dy]+[Tb])−(9×[O]+12×[C])≤27.3 mass %, neither Pr nor M is excessively diffused into the interior of the magnet and the diffusion of Tb is allowed to significantly progress. The sintered R-T-B based magnet thus obtained has an atomic ratio of B with respect to T that is lower than the atomic ratio of B with respect to T in the stoichiometric composition of the $R_2T_{14}B$ compound, and satisfies the relationships of:

26.0 mass %≤([Nd]+[Pr]+[Ce]+[Dy]+[Tb])−(9×[O]+12×[C])≤27.5 mass %, 0.15 mass %≤[O]≤0.30 mass %, and 0.05 mass %<[Tb]≤0.35 mass %.

Hereinafter, a sintered R-T-B based magnet according to an embodiment of the present disclosure will be described in detail.

<Sintered R-T-B Based Magnet>

The sintered R-T-B based magnet according to the present disclosure includes a main phase formed of an $R_2T_{14}B$ compound and a grain boundary phase at the brain boundaries of the main phase. The sintered R-T-B based magnet includes a portion in which at least one of a concentration of Tb and a concentration of Dy gradually decreases from the surface toward the interior thereof. The portion in which at least one of the Tb concentration and the Dy concentration gradually decreases from the surface toward the interior of the magnet is formed by diffusing at least one of Tb and Dy from surface toward the interior of the magnet. This will be described below in detail.

With respect to the sintered R-T-B based magnet in this embodiment, the content (mass %) of Nd will be represented as [Nd], the content (mass %) of Pr will be represented as [Pr], the content (mass %) of Ce will be represented as [Ce], the content (mass %) of Dy will be represented as [Dy], the content (mass %) of Tb will be represented as [Tb], the content (mass %) of T will be represented as [T], the content (mass %) of B will be represented as [B], the content (mass %) of O will be represented as [O], and the content (mass %) of C will be represented as [C]. These contents may be 0 mass %, or equal to, or lower than, the limit of measurement, unless any lower limit is specified. In other words, the sintered R-T-B based magnet in this embodiment does not need to contain, for example, Ce or Dy.

As described above, in this embodiment, the atomic ratio of B with respect to T in the sintered R-T-B based magnet is lower than the atomic ratio of B with respect to T in the stoichiometric composition of the $R_2T_{14}B$ compound. This may be represented by expression (1) below by use of the mass ratio (mass %), instead of the atomic ratio (T is based on Fe, and therefore, the number of atoms of Fe is used).

$$[T]/55.85 > 14 \times [B]/10.8 \qquad (1)$$

In the sintered R-T-B based magnet according to this embodiment, the range of the content of oxygen is defined by 0.15 mass %≤[O]≤0.30 mass %. The oxygen content in such a range may be realized by controlling oxidation conditions during the formation of coarse-pulverized powder (hydrogen-pulverized powder) or fine-pulverized powder of the raw material alloy. This will be described below.

The sintered R-T-B based magnet according to this embodiment satisfies the following expression (2).

$$26.0 \text{ mass \%} \leq ([Nd]+[Pr]+[Ce]+[Dy]+[Tb])-(9\times[O]+12\times[C]) \leq 27.5 \text{ mass \%} \qquad (2)$$

Namely, in this embodiment, the contents of the light rare-earth element RL (RL contains Nd, and may contain Pr and/or Ce), the heavy rare-earth element RH (Tb and/or Dy), O and C in the sintered R-T-B based body are adjusted, and thus expression (2) above is satisfied. The content of C may be adjusted by the amount of lubricant incorporated at the time of pulverization or pressing. Preferably, the range of expression (2) is not lower than 26.0 mass % and not higher than 27.2 mass %. With such a range, high $B_r$ and high $H_{cJ}$ are provided while the amount of Tb is suppressed to be smaller.

Expression (2) above represents an effective range of the contents of the rare-earth elements after the amounts of the light rare-earth element RL and the heavy rare-earth element RH that are contained in the sintered R-T-B based magnet but are bound with O or C and thus are taken into the grain boundary phase are excluded. A main component among the rare-earth elements contained in the sintered R-T-B based magnet is Nd. Therefore, Nd may be selected as a representative of Nd, Pr, Ce, Dy and Tb to estimate the weight ratio of the rare-earth elements consumed to be bound with each of O and C. Nd, O and C have atomic weights of about 144, about 16, and about 12, respectively. Therefore, the weight of [Nd] consumed by being bound with [O] of 1.0 mass is 144/16=9.0 mass. Similarly, the weight of [Nd] consumed by being bound with [C] of 1.0 mass is 144/12=12.0 mass. Based on these, expression (2) above approximately shows the amounts of the rare-earth elements (Nd, Pr, Ce, Dy, Tb) after the amounts of the rare-earth elements consumed by being bound with O or C are excluded.

In the present disclosure, ([Nd]+[Pr]+[Ce]+[Dy]+[Tb])−(9×[O]+12×[C]) may be referred to as an "R' amount". Expression (2) above defines that the R' amount is in the range not lower than 26.0 mass % and not higher than 27.5 mass %. It has been found out that in the case where the R' amount is lower than 26.0 mass %, Tb, Pr and M are not easily supplied from the surface of the magnet into the interior thereof and thus the $H_{cJ}$ may possibly be decreased. It has also been found out that in the case where the R' amount is higher than 27.5 mass %, the heavy rare-earth element RH or the like is excessively diffused from the surface of the magnet into the interior thereof and thus the $B_r$ may possibly be decreased. In the case where the R' amount is in the above-described range, the sintered R-T-B based magnet has higher $B_r$ and higher $H_{cJ}$. The light rare-earth element RL (RL contains Nd, and may contain Pr and/or Ce) is contained at a content that is not lower than 90 mass % of all the rare-earth elements R. In the case where the content of the light rare-earth element RL is lower than 90 mass % of all the rare-earth elements R, the $B_r$ may possibly be decreased.

With respect to the sintered R-T-B based magnet in this embodiment, Tb is contained at a content of 0.05 mass %<[Tb]≤0.35 mass %. The content of oxygen is adjusted to be in the above-described range, and the content of the light rare-earth element RL is controlled to satisfy expression (2) above. In this case, the diffusion of Tb is promoted with no excessive diffusion of a metal element M such as Ga or the like, or with no excessive diffusion of Pr, into the interior of the magnet. As a result, intended high properties of the magnet are realized even with a relatively low content of Tb.

The sintered R-T-B based magnet provided in this manner has remanence ($B_r$) of 1.43 T or higher and coercivity ($H_{cJ}$) of 1900 kA/m or higher, but still contains Tb at a content that is not higher than 0.35 mass % (preferably not higher than 0.30 mass %, and more preferably not higher than 0.25 mass %). The sintered R-T-B based magnet has extremely high $B_r$ and high $H_{cJ}$ with the amount of use of Tb being decreased.

The magnetic properties, specifically, the $B_r$ and the $H_{cJ}$, of the sintered R-T-B based magnet indicate the magnetic properties of the entirety of the magnet, and may be measured by, for example, a B—H tracer. In the case where the magnet is too large and the magnetic properties of the entirety of the magnet cannot be measured, a corner (end) of the magnet, for example, may be processed into a cube of approximately 7 mm per side (7 mm×7 mm×7 mm) and this cube may be measured by the B—H tracer. In the case where the magnet is too small, a plurality of magnets may be stacked to form a cube of approximately 7 mm per side, and this cube may be measured by the B—H tracer. The above-mentioned contents of Tb, RL and oxygen indicate the composition of the entirety of the magnet (average composition). The contents of Tb and RL may be measured for the entirety of the magnet by use of, for example, Inductivity Coupled Plasma Optical Emission Spectroscopy (ICP-OES). The content of oxygen may be measured by, for example, a gas fusion infrared absorption method by use of a gas analyzer.

In the sintered R-T-B based magnet according to this embodiment, Tb and/or Dy is diffused from the surface toward the interior thereof. As a result, the sintered R-T-B based magnet includes a portion in which at least one of the Tb concentration and the Dy concentration gradually decreases from the surface toward the interior thereof.

Figure 2A:
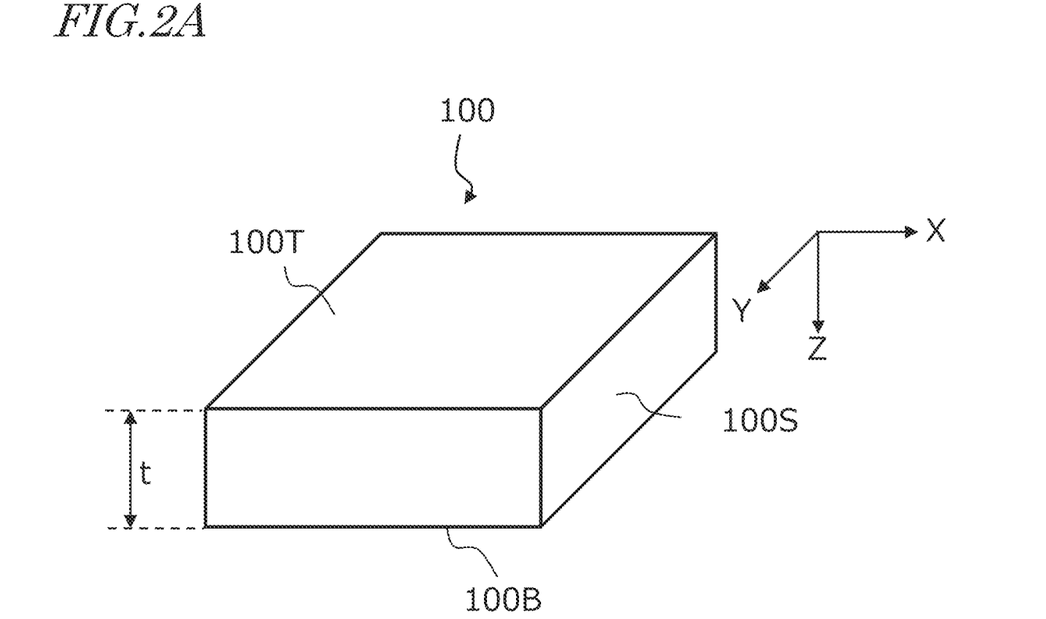
FIG. 2A is a perspective view schematically showing a sintered R-T-B based magnet 100 according to an embodiment of the present disclosure.
Figure 2B:
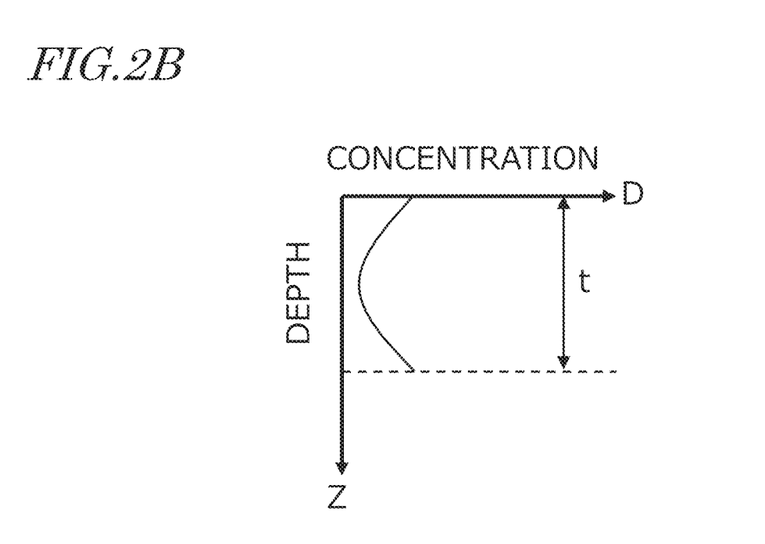
FIG. 2B is a graph showing an example of a portion, of the sintered R-T-B based magnet 100, in which at least one of a concentration of Tb and a concentration of Dy gradually decreases from a surface toward an interior thereof.

FIG. 2A is a perspective view schematically showing a sintered R-T-B based magnet 100 according to this embodiment. FIG. 2B is a graph showing an example of a portion, of the sintered R-T-B based magnet 100, in which at least one of the Tb concentration and the Dy concentration gradually decreases from the surface toward the interior thereof. FIG. 2A shows an X axis, a Y axis and a Z axis perpendicular to each other for reference.

In the example shown in FIG. 2A, the sintered R-T-B based magnet 100 has a top surface 100T, a bottom surface 100B and side surfaces 100S, which each correspond to a part of the surface of the magnet. The size in a Z-axis direction of the sintered R-T-B based magnet 100 is thickness t. In the graph shown in FIG. 2B, the vertical axis represents the depth (Z) from the top surface 100T of the sintered R-T-B based magnet 100, and the horizontal axis represents the concentration (D) of at least one of Tb and Dy. In this example, Tb is diffused from each of the top surface 100T and the bottom surface 100B into the interior of the sintered R-T-B based magnet 100. As a result, as shown in FIG. 2B, a portion in which at least one of the Tb concentration and the Dy concentration gradually decreases from the surface toward the interior of the magnet is present on both of the top surface 100T side and the bottom surface 100B side as seen from the center of the magnet.

The significance of the sintered R-T-B based magnet including a portion in which at least one of the Tb concentration and the Dy concentration gradually decreases from the surface toward the interior thereof will be described. As described above, the state where the sintered R-T-B based magnet includes a portion in which at least one of the Tb concentration and the Dy concentration gradually decreases from the surface toward the interior thereof indicates a state where at least one of Tb and Dy is diffused from the surface into the interior of the magnet. This state may be confirmed by, for example, a line analysis performed by use of Energy-Dispersive X-ray Spectroscopy (EDX) on a region, of any cross-section of the sintered R-T-B based magnet, from the surface to the center or the vicinity thereof of the magnet.

The Tb and Dy concentrations may vary in accordance with whether the site of measurement is in the main phase crystal grains ($R_2T_{14}B$ compound grains) or at the grain boundaries, in the case where the site of measurement has a size of, for example, submicron order. In the case where the site of measurement is at the grain boundaries, the Tb or Dy concentration may vary locally or microscopically in accordance with the type or the manner of distribution of a Tb- or Dy-containing compound that may be formed at the grain boundaries. However, in the case where Tb or Dy is diffused from the surface into the interior of the magnet, it is unequivocal that an average value of the concentrations of such an element at positions at an equal depth from the surface of the magnet gradually decreases from the surface toward the interior of the magnet. According to the present disclosure, in the case where at least one of the average concentration values of Tb and Dy, each measured as a function with the depth being a parameter, decreases along with an increase in the depth in at least a region from the surface to a depth of 200 μm of the sintered R-T-B based magnet, it is defined that the sintered R-T-B based magnet includes a portion in which at least one of the Tb concentration and the Dy concentration gradually decreases.

During the production of the sintered R-T-B based magnet according to this embodiment, preferably Pr is diffused, in addition to a heavy rare-earth element RH such as Tb, Dy or the like, from the surface into the interior of the magnet. Therefore, in a preferred embodiment, the sintered R-T-B based magnet includes a portion in which a concentration of Pr gradually decreases. In a preferred embodiment, a metal element M such as Ga or the like (M is at least one selected from the group consisting of Ga, Cu, Zn and Si) is diffused, together with a heavy rare-earth element such as Tb, Dy or the like and Pr, from the surface into the interior of the magnet. Therefore, in a more preferred embodiment, the sintered R-T-B based magnet includes a portion in which a concentration of the element M (M is at least one selected from the group consisting of Ga, Cu, Zn and Si) gradually decreases from the surface toward the interior thereof.

The state where the sintered R-T-B based magnet includes a portion in which the concentration of Tb, Pr, Ga or the metal element M gradually decreases from the surface toward the interior thereof indicates a state where such an element is diffused from the surface into the interior of the magnet. Whether or not the sintered R-T-B based magnet "includes a portion in which the concentration of a predetermined element gradually decreases from the surface toward the interior thereof" may be confirmed by, for example, a line analysis performed by use of Energy-Dispersive X-ray Spectroscopy (EDX) on a region, of any cross-section of the sintered R-T-B based magnet, from the surface to the center or the vicinity thereof of the magnet. There may be a case where the concentration of such a predetermined element is increased or decreased locally in accordance with whether the site of measurement is in the main phase crystal grains ($R_2T_{14}B$ compound grains) or at the grain boundaries, or in accordance with the type or the presence/absence of a compound, containing Tb, Pr, Ga or the metal element M, that is generated in the pre-diffusion sintered R1-T-B based body or at the time of diffusion. However, the overall concentration gradually decreases (is gradually lowered) toward the interior of the magnet. Therefore, even if the concentration of such a predetermined element is increased or decreased locally, the sintered R-T-B based magnet is deemed to "include a portion in which the concentration of a predetermined element gradually decreases from the surface toward the interior thereof" as defined by the present disclosure.

The sintered R-T-B based magnet according to this embodiment may have, for example, the following composition.

R: not lower than 26.8 mass % and not higher than 31.5 mass % (R is at least one of rare-earth elements, and contains Tb and a light rare-earth element RL. The content of the light rare-earth element RL is not lower than 90 mass % of the entirety of R.);

B: not lower than 0.80 mass % and not higher than 0.97 mass %;

M: not lower than 0.05 mass % and not higher than 1.0 mass % (M is at least one selected from the group consisting of Ga, Cu, Zn and Si);

M1: not lower than 0 mass % and not higher than 2.0 mass % (M1 is at least one selected from the group consisting of Al, Ti, V, Cr, Mn, Ni, Zr, Nb, Mo, Ag, In, Sn, Hf, Ta, W, Pb and Bi.); and the remaining part T (T is Fe, or Fe and Co), and unavoidable impurities.

R may include, as a light rare-earth element RL, La, Ce, Pr, Pm, Sm, Eu or the like in addition to Nd. In general, O (oxygen), N (nitrogen), C (carbon) and the like are contained as the unavoidable impurities. In an embodiment of the present disclosure, attention is paid to, in particular, behaviors of O and C, and the relationship between the contents thereof and the content of a predetermined rare-earth element is defined. As a result, high $B_r$ and high $H_{cJ}$ are successfully realized.

<Method for Producing the Sintered R-T-B Based Magnet>

Hereinafter, an embodiment of a method for producing the sintered R-T-B based magnet according to the present disclosure will be described.

Figure 3:
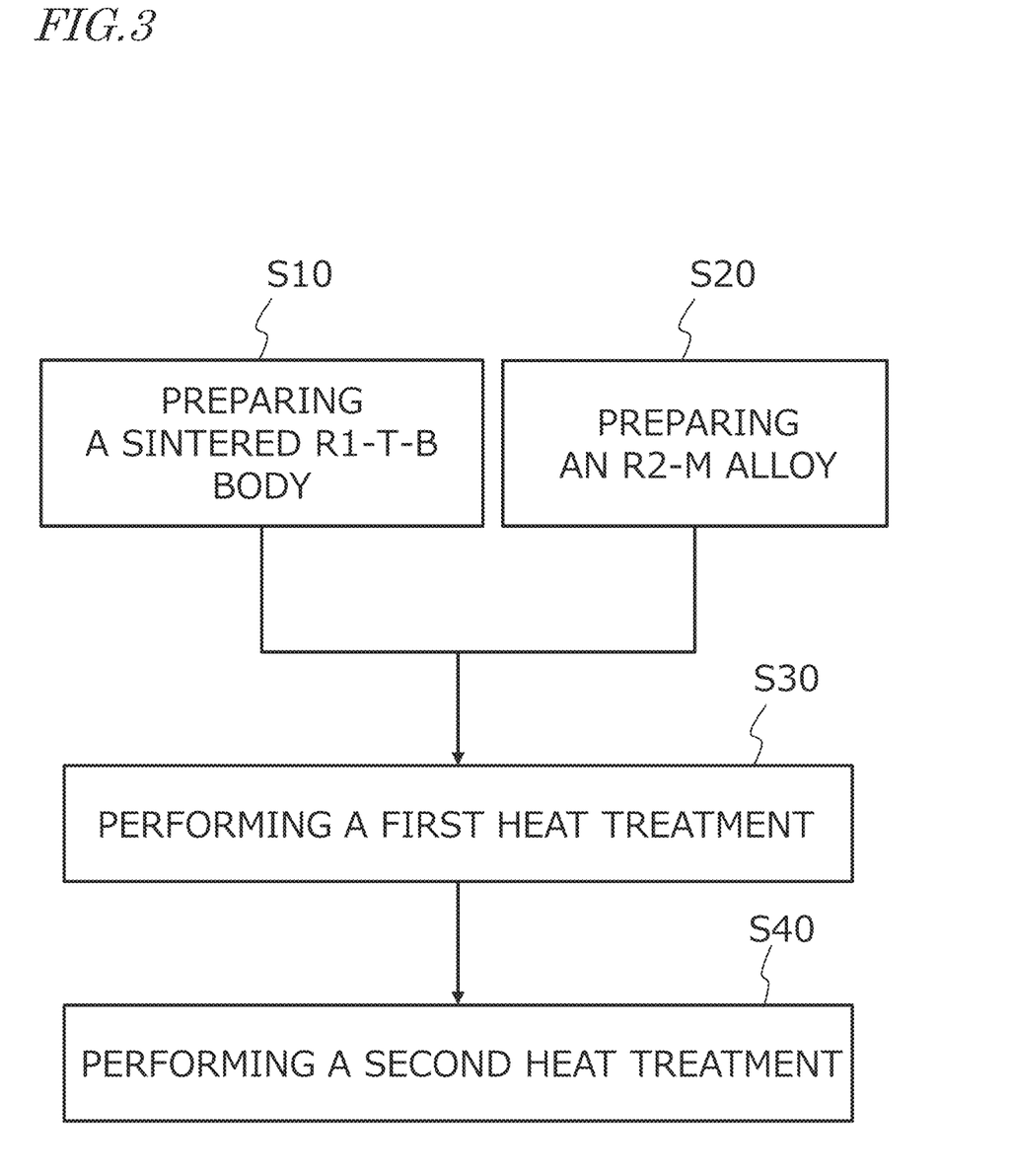
FIG. 3 is a flowchart showing example steps of a method for producing the sintered R-T-B based magnet according to an embodiment of the present disclosure.

As shown in FIG. 3, the production method according to this embodiment may include, for example, step S10 of preparing a sintered R1-T-B based body, step S20 of preparing an R2-M alloy, step S30 of performing a first heat treatment, and step S40 of performing a second heat treatment. In step S30, the sintered R1-T-B based body and the R2-M alloy are subjected to a first heat treatment at a temperature not lower than 700° C. and not higher than 950° C. in a vacuum or an inert gas atmosphere, while at least a portion of the R2-M alloy is kept in contact with at least a portion of a surface of the sintered R1-T-B based body, to diffuse R2 and M into the interior of the magnet. In step S40, the sintered R-T-B based magnet produced as a result of the first heat treatment is subjected to a second heat treatment at a temperature that is not lower than 450° C. and not higher than 750° C. but is lower than the temperature of the first heat treatment, in a vacuum or an inert gas atmosphere. Hereinafter, each of these steps will be described in more detail.

(Step of Preparing the Sintered R1-T-B Based Body)

First, a composition of the sintered R1-T-B based body will be described.

One of features of the sintered R1-T-B based body used in this embodiment is that the amounts of R1, oxygen, carbon and the like contained in the sintered R1-T-B based body are adjusted to produce, as a final product, a sintered R-T-B based magnet satisfying expression (1) above. Therefore, as the sintered R1-T-B based body, a sintered R1-T-B based body satisfying the relationships of 25.8 mass %≤([Nd]+[Pr]+[Ce]+[Dy]+[Tb])−(9×[O]+12×[C])≤27.3 mass % and 0.15 mass %≤[O]≤0.30 mass % is prepared. Preferably, a sintered R1-T-B based body satisfying the relationship of 0.05 mass %≤[C]≤0.18 mass % is prepared. Such a sintered R1-T-B based body is subjected to a diffusion step described below. As a result, Pr, M or the like is not excessively diffused into the interior of the sintered R1-T-B based body, and the diffusion of Tb or Dy into the grain boundaries is allowed to be significantly promoted.

The sintered R1-T-B based body prepared in this step has, for example, the following composition.

R1: not lower than 26.6 mass % and not higher than 31.5 mass % (R is at least one of rare-earth elements, and contains a light rare-earth element RL. The RL is contained at a content that is not lower than 90 mass % of the entirety of R1.);

B: not lower than 0.90 mass % and not higher than 0.97 mass %;

M: not lower than 0 mass % and not higher than 1.0 mass % (M is at least one selected from the group consisting of Ga, Cu, Zn and Si);

M1: not lower than 0 mass % and not higher than 2.0 mass % (M1 is at least one selected from the group consisting of Al, Ti, V, Cr, Mn, Ni, Zr, Nb, Mo, Ag, In, Sn, Hf, Ta, W, Pb and Bi); and the remaining part T (T is Fe, or Fe and Co), and unavoidable impurities.

It is preferred that Nd is contained at a content that is not lower than 80 mass % of the entirety of RL.

The sintered R1-T-B based body also satisfies expression (1) above.

Now, a method for preparing the sintered R1-T-B based body will be described.

First, an alloy for the sintered R-T-B based magnet is prepared, and then the alloy is coarsely pulverized by, for example, hydrogen pulverization or the like.

An example of method for producing an alloy for the sintered R-T-B based magnet will be described. A metal material or an alloy adjusted in advance so as to have the above-described composition is melted, and the melted metal material or alloy is treated with an ingot casting method; specifically, is put into a casting mold and solidified. As a result, an alloy ingot is provided. Alternatively, a strip casting method may be used, by which a metal material or an alloy adjusted in advance so as to have the above-described composition is melted, and the melted metal material or alloy is quenched by being in contact with a single roll, a twin roll, a rotary disc, a rotary cylindrical casting mold or the like to produce a quenched solidified alloy. Another quenching method such as a centrifugal casting method or the like may be used to produce a flake-like alloy.

In an embodiment of the present disclosure, an alloy produced by either the ingot method or the quenching method is usable. It is preferred to use an alloy produced by the quenching method such as the strip casting method or the like. The alloy produced by the quenching method usually has a thickness in the range of 0.03 mm to 1 mm, and is flake-like. The melted alloy starts solidifying from a surface thereof that is in contact with a cooling roll (roll contact surface), and a crystal grows like a column in a thickness direction from the roll contact surface. The quenched alloy has been cooled in a shorter time period than an alloy (alloy ingot) produced by the conventional ingot casting method (mold casting method), and therefore, has a finer tissue, a shorter crystal grain size, and a larger area of grain boundaries. The R-rich phase largely expands in the grain boundaries, and the quenching method is highly effective in dispersing the R-rich phase. For this reason, the R-rich phase is easily broken at the grain boundaries by a hydrogen pulverizing method. The quenched alloy may be hydrogen-pulverized, so that the hydrogen-pulverized powder (coarse-pulverized powder) has a size that is, for example, not longer than 1.0 mm. The coarse-pulverized powder provided in this manner is pulverized by a jet mill.

The jet mill pulverization is performed in an atmosphere of inert gas such as nitrogen or the kike. The pulverization may be performed by, for example, a jet mill in a humid atmosphere. In a conventional pulverization step of decreasing the particle size of powder particles, the pulverization efficiency is low, and in addition, there is a case where the powder particles are deteriorated (nitrided) by inert gas (particularly in the case where dry nitrogen gas is used as the inert gas) in the pulverization step. In such a case, the desired effect that the magnetic properties are improved by decreasing the particle size of the powder particles is not provided. Use of humidified inert gas suppresses the deterioration of the powder particles, which would otherwise be caused by the inert gas. An oxide film is formed on surfaces of the powder particles by pulverization in a humid atmosphere. This prevents introduction of the inert gas (in particular, nitrogen gas) into the interior of the powder particles. As a result, the deterioration (nitriding) of the powder particles, which would otherwise be caused by the inert gas, is suppressed. In this embodiment, the powder particles are pulverized in a humid atmosphere such that the content of oxygen is in a predetermined range in the sintered R-T-B based magnet provided as a final product. This suppresses both of the deterioration (nitriding) of the powder particles and the decrease in the magnetic properties, which would otherwise be caused by the oxidation in a humid atmosphere.

In this embodiment, conditions for pulverization in a humid atmosphere are adjusted such that the content of oxygen in the sintered R-T-B based magnet provided as a final product is in a specified range (0.15 mass %≤[O]≤0.30 mass %), and in addition, the particle size of the powder particles is decreased (the average particle size is not shorter than 2.0 μm and not longer than 4.5 μm; and preferably, is not shorter than 2.0 μm and not longer than 3.5 μm). Such pulverization in a humid atmosphere improves the ease of pulverization and suppresses the decrease in the magnetic properties, which would otherwise by caused by the oxidation or the nitriding in the pulverization step. The content of oxygen is not limited to being adjusted by pulverization in a humid atmosphere. The content of oxygen may be adjusted during, for example, hydrogen pulverization of the quenched alloy (during the formation of the coarse-pulverized powder).

Fine-pulverized powder to be used to produce the sintered R1-T-B based body may be formed of one type of raw material alloy (single raw material alloy) or formed by a method of mixing two or more types of raw material alloys (by a blend method) as long as the above-described conditions are satisfied.

In a preferred embodiment, a powder compact is formed of the above-mentioned fine-pulverized powder by a magnetic field press, and then is sintered. Preferably, the magnetic field press to form the powder compact is performed in an inert gas atmosphere or by a wet press from the point of view of suppressing the oxidation. In the case where, in particular, the wet press is used, surfaces of particles that form the powder compact are covered with a dispersant such as oil or the like and thus is suppressed from being in contact with oxygen or water vapor in the air. Therefore, the particles are prevented or suppressed from being oxidized by the air before, during, or after the pressing step. This makes it easy to control the content of oxygen to be within a predetermined range. In the case where the magnetic field wet press is performed, a slurry of the fine-pulverized powder mixed with a dispersion medium is prepared, and is supplied to a cavity of a mold of a wet press device to be pressed in a magnetic field.

Next, the compact is sintered to provide the sintered R1-T-B based body. The compact is sintered at a pressure that is preferably not higher than 0.13 Pa ($10^{-3}$ Torr), and more preferably not higher than 0.07 pa ($5.0\times10^{-4}$ Torr), and at a temperature in the range of 1000° C. to 1150° C. In order to prevent the compact from being oxidized by sintering, the gas remaining in the atmosphere may be replaced with inert gas such as helium, argon or the like. The sintered body thus provided may be heat-treated. Heat treatment conditions such as the heat treatment temperature, the heat treatment time period and the like may be known conditions.

(Step of Preparing the R2-M Alloy)

In this embodiment, Tb is selected as the heavy rare-earth element RH and is diffused together with Pr and Ga, which is a metal element M, from the surface of the sintered R1-T-B based body into the interior thereof. For performing this, an R2-M alloy containing these elements to be diffused is prepared.

First, a composition of the R2-M alloy will be described. In the R2-M alloy, R2 contains at least two of rare-earth elements, and contains Tb and Pr. Preferably, with respect to the entirety of the R2-M alloy, R2 is contained at a content that is not lower than 65 mass % and not higher than 97 mass %, and M is contained at a content that is not lower than 3 mass % and not higher than 35 mass %. With respect to the entirety of the R2-M alloy, Tb in R2 is preferably contained at a content that is not lower than 3 mass % and not higher than 24 mass %. With respect to the entirety of the R2-M alloy, Pr in R2 is preferably contained at a content that is not lower than 65 mass % and not higher than 86 mass %. In the case where M is Ga, 50 mass % of less of Ga may be replaced with at least one of Cu and Sn. The R2-M alloy may contain unavoidable impurities. In the present disclosure, the expression "50% of less of Ga is replaced with Cu" indicates that where Ga is contained in the R2-M alloy at a content of 100% (mass %), 50% thereof may be replaced with Cu. Pr in the R2-M alloy is preferably contained at a content not lower than 50 mass % with respect to the entirety of R2, and more preferably, R2 is formed of only Pr and Tb. Pr contained in the R2-M alloy allows the diffusion in the grain boundary phase to progress easily, which allows Tb to be diffused more efficiently. As a result, higher $H_{cJ}$ is provided.

The R2-M alloy may have any shape or size with no specific limitation. The R2-M alloy may be in the form of film, foil, powder, blocks, particles or the like.

Now, a method for preparing the R2-M alloy will be described.

The R2-M alloy may be prepared by a method for producing a raw material alloy that is adopted in generic methods for producing a sintered R-T-B based magnet, e.g., a mold casting method, a strip casting method, a single roll rapid quenching method (melt spinning method), an atomization method, or the like. Alternatively, the R2-M alloy may be prepared by pulverizing an alloy formed as above with a known pulverization device such as a pin mill or the like.

(Diffusion Step)

A diffusion step is performed, by which the sintered R1-T-B based body and the R2-M alloy prepared by the above-described methods are subjected to the first heat treatment at a temperature not lower than 700° C. and not higher than 950° C. in a vacuum or an inert gas atmosphere, while at least a portion of the R2-M alloy is kept in contact with at least a portion of the surface of the sintered R1-T-B based body, to diffuse R2 and M into the interior of the magnet. As a result, a liquid phase containing Tb, Pr and M is generated from the R2-M alloy, and the liquid phase is introduced from the surface of the sintered R1-T-B based body into the interior thereof through diffusion, via the grain boundaries of the sintered body. At this point, it is preferred that the content of the heavy rare-earth element RH (preferably, Tb) in the sintered R1-T-B based body is increased by a level in an infinitesimal range that is not lower than 0.05 mass % and not higher than 0.30 mass %. This provides an extremely high effect of improving the $H_{cJ}$ while suppressing the amount of consumption of the heavy rare-earth element RH. In order to increase the content of Tb in the sintered R1-T-B based body by a level not lower than 0.05 mass % and not higher than 0.30 mass %, various conditions may be adjusted such as the amount of the R2-M alloy, the heating temperature during the first heat treatment, the particle size (in the case where the R2-M alloy is in a particle form), the time period of the first heat treatment, and the like. Among these conditions, adjustment on the amount of the R2-M alloy and the heating temperature during the first heat treatment allows the amount of introduction (amount of increase) of the heavy rare-earth element RH to be controlled relatively easily.

In this specification, the expression "the content of Tb is increased by a level not lower than 0.05 mass % and not higher than 0.30 mass %", for example, indicates that the value of the content as expressed in mass % is increased by a level not lower than 0.05 and not higher than 0.30. For example, it is assumed that the content of Tb in the sintered R1-T-B based body before the diffusion step is 0.50 mass % and the content of Tb in the sintered R-T-B based magnet after the diffusion step is 0.60 mass %. This indicates that the content of Tb is increased by 0.10 mass % by the diffusion step. Whether or not the content of at least one of Tb and Dy (RH amount) is increased by a level not lower than 0.05 mass % and not higher than 0.30 mass % may be checked by measuring the RH amount in the entirety of the sintered R1-T-B based body before the diffusion step and the RM amount in the entirety of the sintered R-T-B based magnet after the diffusion step (or the sintered R-T-B based magnet after the second heat treatment), and thus finding how much the RH amount is increased after the diffusion as compared with the RH amount before the diffusion. In the case where any thickened portion of the R2-M alloy exists on the surface of the sintered R-T-B based magnet after the diffusion (or on the surface of the sintered R-T-B based magnet after the second heat treatment), it is desirable that the RH amount is measured after the thickened portion is removed by cutting or the like.

In the case where the temperature of the first heat treatment is lower than 700° C., the amount of the liquid phase containing, for example, Tb, Pr and M is too small to provide high $H_{cJ}$. By contrast, in the case where the temperature of the first heat treatment exceeds 950° C., the $H_{cJ}$ may possibly be decreased. Preferably, the temperature of the first heat treatment is not lower than 850° C. and not higher than 950° C. With such a temperature range, higher $H_{cJ}$ is provided. It is preferred that the sintered R-T-B based magnet, produced as a result of the first heat treatment (not lower than 700° C. and not higher than 950° C.), is cooled to 300° C. at a cooling rate of at least 5° C./minute from the temperature of the first heat treatment. With such a cooling rate, higher $H_{cJ}$ is provided. More preferably, the cooling rate down to 300° C. is at least 15° C./minute.

The first heat treatment may be performed by use of a known heat treatment apparatus on an R2-M alloy of any shape located on the surface of the sintered R1-T-B based body. For example, the first heat treatment may be performed while the surface of the sintered R1-T-B based body is covered with a powder layer of the R2-M alloy. For example, a slurry having the R2-M alloy dispersed in a dispersion medium may be applied on the surface of the sintered R1-T-B based body, and then the dispersion medium may be evaporated to allow the R2-M alloy to come into contact with the sintered R1-T-B based body. Examples of the dispersion medium include alcohols (ethanol, etc.), aldehydes, and ketones. The heavy rare-earth element RH is not limited to being introduced from the R2-M alloy, but may also be introduced by locating a fluoride, an oxide, an oxyfluoride or the like of the heavy rare-earth element RH, together with the R2-M alloy, on the surface of the sintered R-T-B based magnet. In other words, there is no specific limitation on the method of diffusion as long as the light rare-earth element RL and M are diffused simultaneously with the heavy rare-earth element RH. Examples of the fluoride, oxide, and oxyfluoride of the heavy rare-earth element RH include $TbF_3$, $DyF_3$, $Tb_2O_3$, $Dy_2O_3$, $Tb_4OF$, and $Dy_4OF$.

The R2-M alloy may be placed at any position as long as at least a portion thereof is in contact with at least a portion of the sintered R1-T-B based body. Preferably, the R2-M alloy is placed so as to be in contact with at least a surface of the sintered R1-T-B based body that is perpendicular to the direction in which the sintered R1-T-B based body is magnetically aligned. This allows the liquid phase containing R2 and M to be introduced from the surface into the interior of the magnet more efficiently through diffusion. In this case, the R2-M alloy may be in contact with only a surface of the sintered R1-T-B based body that is perpendicular to the direction in which the sintered R1-T-B based body is magnetically aligned, or may be in contact with the entirety of the surfaces of the sintered R1-T-B based body.

(Step of Performing the Second Heat Treatment)

The sintered R-T-B based body produced as a result of the first heat treatment is subjected to a heat treatment at a temperature that is not lower than 450° C. and not higher than 750° C. but is lower than the temperature used in the step of performing the first heat treatment, in a vacuum or an inert gas atmosphere. In the present disclosure, this heat treatment is referred to as the "second heat treatment". The second heat treatment allows high $H_{cJ}$ to be provided. In the case where the second heat treatment is performed at a temperature higher than that in the first heat treatment, or in the case where the temperature of the second heat treatment is lower than 450° C. or higher than 750° C., high $H_{cJ}$ may not possibly be provided.

EXAMPLES

Experiment Example 1

Raw materials of each of the elements were weighed such that the sintered R1-T-B based bodies would have the compositions shown in Nos. A through I in Table 1, and alloys were produced by a strip casting method. The obtained alloys were each coarse-pulverized by a hydrogen pulverizing method to obtain a coarse-pulverized powder. Next, zinc stearate as a lubricant was incorporated into, and mixed with, the obtained coarse-pulverized powder at a ratio of 0.04 mass % with respect to 100 mass % of the coarse-pulverized powder. Then, the resultant substance was dry-milled in a nitrogen jet by an airflow crusher (jet mill machine) to obtain a fine-pulverized powder (alloy powder) having a particle size $D_{50}$ of 3 μm. Zinc stearate as a lubricant was incorporated into, and mixed with, the fine-pulverized powder at a ratio of 0.05 mass % with respect to 100 mass % of the fine-pulverized powder. Then, the resultant substance was pressed in a magnetic field to obtain a compact. As a pressing apparatus, a so-called orthogonal magnetic field pressing apparatus (transverse magnetic field pressing apparatus) was used, in which the direction of magnetic field application was orthogonal to the pressurizing direction. The obtained compact was sintered at a temperature not lower than 1060° C. and not higher than 1090° C. (a temperature at which a sufficiently dense texture would result through sintering was selected for each sample) for 4 hours to obtain a sintered R1-T-B based body. The obtained sintered R1-T-B based body had a density of 7.5 $Mg/m^3$ or higher. Measurement results on the components of the obtained sintered R1-T-B based bodies are shown in Table 1. The content of each of the components in Table 1 was measured by using Inductively Coupled Plasma Optical Emission Spectroscopy (ICP-OES). The content of O (oxygen) was measured by a gas fusion infrared absorption method by use of a gas analyzer. The same is applicable to measurement results on the components of the R2-M alloy and the components of the sintered R-T-B based magnet. Table 1 shows the values of ([Nd]+[Pr]+[Ce]+[Dy]+[Tb])−(9×[O]+12×[C]) of the sintered R1-T-B based bodies. In this experiment example, neither Tb nor Ce was positively incorporated into the sintered R1-B-T based bodies.

TABLE 1

| No. | COMPOSITION OF SINTERED R1-T-B BASED BODY (MASS %) | | | | | | | | | | | | ([Nd] + [Pr] + [Ce] + [Dy] + [Tb]) − (9 × [O] + 12 × [C]) |
|---|---|---|---|---|---|---|---|---|---|---|---|---|---|
| | Nd | Pr | Dy | B | Co | Cu | Al | Ga | Fe | O | C | N | |
| A | 28.4 | 0.1 | 0.3 | 0.95 | 0.49 | 0.04 | 0.08 | 0.11 | bal. | 0.10 | 0.13 | 0.06 | 26.4 |
| B | 28.5 | 0.1 | 0.3 | 0.95 | 0.49 | 0.04 | 0.08 | 0.11 | bal. | 0.11 | 0.14 | 0.07 | 26.3 |
| C | 28.8 | 0.1 | 0.3 | 0.94 | 0.50 | 0.04 | 0.09 | 0.12 | bal. | 0.11 | 0.15 | 0.07 | 26.4 |
| D | 28.5 | 0.1 | 0.3 | 0.95 | 0.49 | 0.03 | 0.08 | 0.11 | bal. | 0.16 | 0.15 | 0.05 | 25.8 |
| E | 28.4 | 0.1 | 0.3 | 0.95 | 0.49 | 0.04 | 0.08 | 0.11 | bal. | 0.17 | 0.13 | 0.02 | 25.8 |
| F | 28.5 | 0.1 | 0.3 | 0.95 | 0.49 | 0.04 | 0.08 | 0.11 | bal. | 0.19 | 0.13 | 0.03 | 25.7 |
| G | 28.7 | 0.1 | 0.3 | 0.95 | 0.49 | 0.04 | 0.08 | 0.12 | bal. | 0.24 | 0.15 | 0.03 | 25.2 |
| H | 28.4 | 0.1 | 0.3 | 0.95 | 0.49 | 0.04 | 0.08 | 0.11 | bal. | 0.21 | 0.12 | 0.02 | 25.5 |
| I | 28.4 | 0.1 | 0.3 | 0.94 | 0.49 | 0.04 | 0.08 | 0.11 | bal. | 0.30 | 0.13 | 0.01 | 24.6 |

Raw materials of each of the elements were weighed such that the R2-M alloy would have approximately the composition shown in No. a in Table 2, and the raw materials were melted to obtain an alloy in a ribbon or flake form by a single roll rapid quenching method (melt spinning method). The obtained alloy was pulverized in an argon atmosphere in a mortar, and then was passed through a sieve with an opening of 425 μm to prepare an R2-M alloy. Table 2 shows the composition of the obtained R2-M alloy.

TABLE 2

| No. | COMPOSITION OF R2-M ALLOY (MASS %) | | | |
|---|---|---|---|---|
| | Pr | Tb | Ga | Cu |
| a | 75.0 | 9.0 | 8.0 | 8.0 |

The sintered R1-T-B based bodies of Nos. A through I in Table 1 were each cut and ground into a 7.4 mm×7.4 mm×7.4 mm cube. Next, the R2-M alloy (No. a) was spread onto the entirety of the surfaces of each of the sintered R1-T-B based bodies of Nos. A through I at a ratio of 3 mass % with respect to 100 mass % of the each of the sintered R1-T-B based bodies. In the diffusion step, the sintered R1-T-B based bodies were each subjected to the first heat treatment at 900° C. in argon at a reduced pressure controlled to be 50 Pa for 4 hours, and then was cooled down to room temperature. As a result, the sintered R-T-B based magnet treated with the first heat treatment was obtained. Then, the sintered R-T-B based magnet obtained as a result of the first heat treatment was subjected to the second heat treatment at 480° C. in argon at a reduced pressure controlled to be 50 Pa for 3 hours, and then was cooled down to room temperature. In this manner, the sintered R-T-B based magnets (Nos. 1 through 9) were produced. Table 3 shows the amount of R (in this experiment example, Nd+Pr+Tb), the amount of Tb, the amount of oxygen (O), the amount of carbon (C), the amount of nitrogen (N), and the value of ([Nd]+[Pr]+[Ce]+[Dy]+[Tb])−(9×[O]+12×[C]) of each of the obtained sintered R-T-B based magnets. In this experiment example, Ce was not positively incorporated into the sintered R-T-B based magnets. Nos. 1 through 9 were confirmed to satisfy expression 1 of the present disclosure. The obtained samples of the sintered R-T-B based magnet were each mechanically processed into a 7 mm×7 mm×7 mm cube, and subjected to a measurement by a B—H tracer. The results of the measurement are shown in Table 3. A line analysis was performed by EDX on a cross-section of each of Nos. 1 through 9, specifically, on a region from the surface to the center or the vicinity thereof of the cross-section. As a result, the Tb, Pr, Ga and Cu concentrations were confirmed to gradually decrease (to be gradually lowered) from the surface toward the central region of the magnet in all the samples.

INDUSTRIAL APPLICABILITY

According to the present disclosure, a sintered R-T-B based magnet having high remanence and high coercivity is produced. The sintered magnet according to the present disclosure is preferred for various motors such as motors for hybrid vehicle-mountable motors exposed to high temperatures, consumer electronics and the like.

REFERENCE SIGNS LIST

12 . . . main phase formed of an $R_2T_{14}B$ compound; 14 . . . grain boundary phase; 14a . . . intergranular grain boundary phase; 14b . . . grain boundary triple junction

The invention claimed is:

1. A sintered R-T-B based magnet (R contains at least two rare-earth elements, contains Nd, and contains at least one of Tb and Dy; T is Fe, or Fe and Co; and B is boron), comprising:
a main phase formed of an $R_2T_{14}B$ compound; and
a grain boundary phase at grain boundaries of the main phase,
wherein
Nd is contained at a content (mass %) represented as [Nd],
Pr is contained at a content (mass %) represented as [Pr],
Ce is contained at a content (mass %) represented as [Ce],
Dy is contained at a content (mass %) represented as [Dy],
Tb is contained at a content (mass %) represented as [Tb],
O is contained at a content (mass %) represented as [O], and
C is contained at a content (mass %) represented as [C],
B has an atomic ratio with respect to T in the sintered R-T-B based magnet that is lower than an atomic ratio of B with respect to T in a stoichiometric composition of the $R_2T_{14}B$ compound, and

TABLE 3

| | | COMPOSITION OF SINTERED R-T-B BASED MAGNET | | | | | | | | |
|---|---|---|---|---|---|---|---|---|---|---|
| | SINTERED | MAGNETIC CHARACTERISTICS | | | | | | | ([Nd] + [Pr] + [Ce] + [Dy] + [Tb]) − (9 × [O] + 12 × [C]) | |
| No. | R1-T-B BASED BODY | $B_r$ T | $H_{cJ}$ kA/m | R mass % | Tb mass % | O mass % | N mass % | C mass % | | REMARKS |
| 1 | A | 1.46 | 1850 | 29.3 | 0.20 | 0.10 | 0.04 | 0.10 | 27.3 | COMPARATIVE EX. |
| 2 | B | 1.45 | 1860 | 29.6 | 0.21 | 0.11 | 0.05 | 0.11 | 27.4 | COMPARATIVE EX. |
| 3 | C | 1.44 | 1830 | 30.1 | 0.23 | 0.11 | 0.02 | 0.13 | 27.6 | COMPARATIVE EX. |
| 4 | D | 1.45 | 1900 | 29.8 | 0.21 | 0.16 | 0.04 | 0.11 | 27.1 | PRESENT INVENTION EX. |
| 5 | E | 1.44 | 1990 | 29.8 | 0.20 | 0.17 | 0.02 | 0.10 | 27.1 | PRESENT INVENTION EX. |
| 6 | F | 1.44 | 1970 | 30.0 | 0.21 | 0.19 | 0.02 | 0.11 | 27.0 | PRESENT INVENTION EX. |
| 7 | G | 1.43 | 1960 | 30.4 | 0.20 | 0.24 | 0.04 | 0.12 | 26.8 | PRESENT INVENTION EX. |
| 8 | H | 1.44 | 1990 | 29.9 | 0.23 | 0.21 | 0.01 | 0.10 | 26.9 | PRESENT INVENTION EX. |
| 9 | I | 1.43 | 1980 | 30.2 | 0.21 | 0.30 | 0.01 | 0.11 | 26.2 | PRESENT INVENTION EX. |

As shown in Table 3, all the examples according to the present invention have $B_r$ of 1.43 T or higher and $H_{cJ}$ of 1900 kA/m or higher. High $B_r$ and high $H_{cJ}$ are provided while the amount of Tb is suppressed to be low. By contrast, none of the comparative examples, which are out of the ranges of the present disclosure, has high $B_r$ of 1.43 T or higher, or high $H_{cJ}$ of 1900 kA/m or higher.

the sintered R-T-B based magnet satisfies the relationships of:

26.0 mass%≤([Nd]+[Pr]+[Ce]+[Dy]+[Tb])−(9×[O]+12×[C])≤27.5 mass %, 0.15 mass %≤[O]≤0.30 mass %, and 0.05 mass %<[Tb]≤0.35 mass %, and wherein the sintered R-T-B based magnet includes a portion in which at least one of a concentration of Tb and a concentration of Dy gradually decreases from a surface toward an interior thereof.

2. The sintered R-T-B based magnet of claim 1, wherein the sintered R-T-B based magnet has remanence ($B_r$) of 1.43 T or higher and coercivity ($H_{cJ}$) of 1900 kA/m or higher.

3. The sintered R-T-B based magnet of claim 1, wherein where B is contained at a content (mass %) represented as [B], 0.90 mass %≤[B]≤0.97 mass %.

4. The sintered R-T-B based magnet of claim 1, wherein 0.05 mass %≤[C]≤0.18 mass %, and [C]<[O].

5. The sintered R-T-B based magnet of claim 1, wherein the sintered R-T-B based magnet includes a portion in which a concentration of Pr gradually decreases from the surface toward the interior thereof.

6. The sintered R-T-B based magnet of claim 1, wherein the sintered R-T-B based magnet includes a portion in which a concentration of M (M is at least one selected from the group consisting of Ga, Cu, Zn and Si) gradually decreases from the surface toward the interior thereof.

7. The sintered R-T-B based magnet of claim 1, wherein 0.05 mass %<[Tb]≤0.30 mass %.

* * * * *